June 24, 1941.  I. TROFIMOV  2,247,005
INJECTOR USING EXHAUST STEAM
Filed June 30, 1939
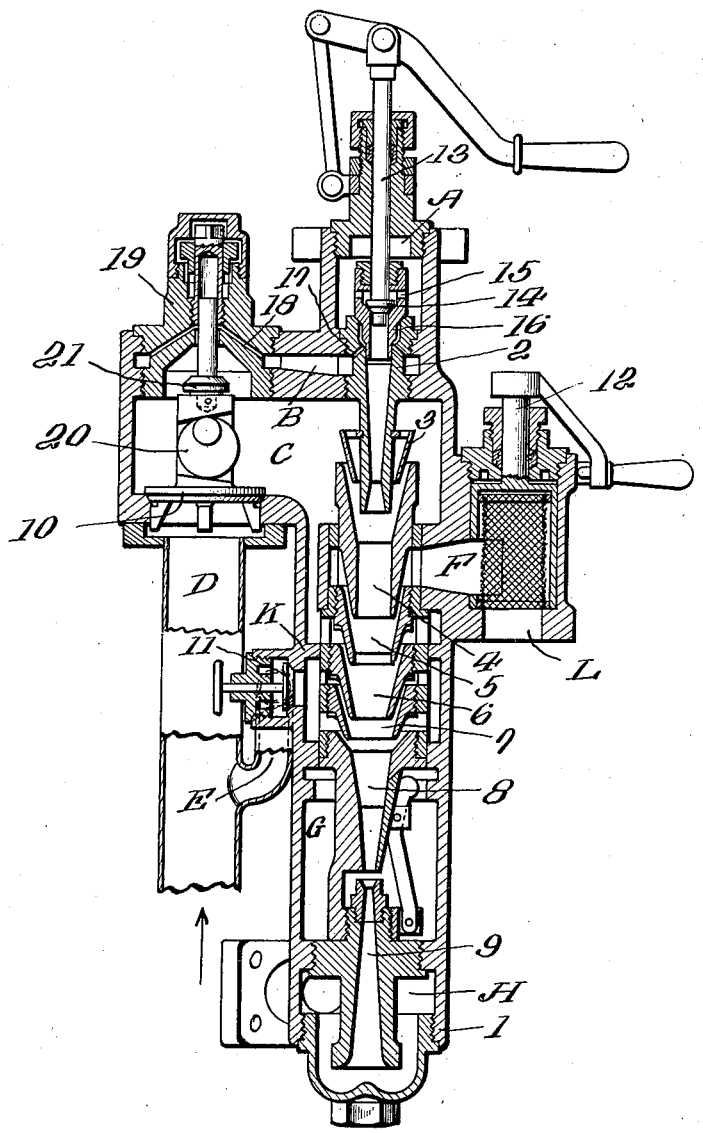
INVENTOR
J. Trofimov
By C. F. Wenderoth
ATTORNEY Patented June 24, 1941

2,247,005

UNITED STATES PATENT OFFICE 2,247,005

INJECTOR USING EXHAUST STEAM

Ivan Trofimov, Khimki, Union of Soviet Socialist Republics

Application June 30, 1939, Serial No. 282,313. In Union of Soviet Socialist Republics March 19, 1937

8 Claims. (Cl. 103—265)

There are known injectors having several nozzles for exhaust steam arranged in series to heat the feed water in several steps.

In the proposed injector, the exhaust-steam chamber with its internal nozzles is divided by a partition into two parts, thus enabling one part with its associated nozzles to be cut out.

In an injector of such construction, exhaust steam having a pressure of 0.2 atmosphere or more is passed in to the nozzles through both chambers, the injector works on exhaust-steam alone. Should the exhaust-steam be of lower pressure, one of the chambers is cut out and the injector works on a mixture of exhaust and fresh steam.

The attached drawing shows the proposed injector in longitudinal cross-section.

In the body 1 of the injector there are two chambers A and C; of these, A is intended for using fresh steam, and the other, C, for exhaust-steam. The channel B serves for supplying steam to the chamber C when the injector works on fresh-steam alone. There is also another chamber I for exhaust-steam separated from the chamber C by a partition K, a chamber F for water, a waste chamber G and feed chamber H. A pipe D, attached to the body of the injector, supplies it with exhaust steam from the locomotive cylinder when the regulator is open.

The section I of the exhaust-steam chamber is connected to the main exhaust-steam inlet D of the injector by a branch-pipe E which may be closed by a valve 11.

A series of nozzles 2, 3, 4, 5, 6, 7, 8 and 9, an exhaust-steam inlet valve 11 and a water regulating cock 12 are in the same body.

When it is desired to start the injector the plunger 13 of the valve 14 is slightly raised and fresh steam leaves the chamber A through the orifice 15 and passes through nozzles 2, 4, 5, 6 and 7; the first injection of steam escapes through the waste chamber G into the air. Simultaneously water is sucked into the injector through the inlet L and the chamber F. As soon as the water begins to enter the injector, the plunger 13 of the valve 14 is lifted more, thus lifting valve 16. Due to this, fresh steam can pass through the orifices 17 in cone 2 into channel B and hence, through the orifice 18 of the fitting 19 passes into the exhaust-steam chamber C. At the same time, fresh steam passes through the above-mentioned nozzles.

When passing through the channel B into the chamber C, the steam expands, the pressure in chamber C being that of exhaust-steam. This artificial exhaust-steam passes through nozzles 3 and 4.

The mixture of steam and water passes into the feed chamber H and thence, through a feed-box, into the boiler.

When exhaust-steam is used to work the injector, the first intake of water is effected as described above, i. e. with fresh steam, and only after the injector has begun to pump water, the exhaust steam is turned on. This is effected by turning the handle of the eccentric 20 which simultaneously cuts off the high-pressure steam entering through the orifice 18 by lifting the conical valve 21 and admits exhaust-steam into chamber C by releasing the valve 10 closing the exhaust-steam inlet pipe D. The exhaust steam passes through nozzles 3, 4 etc. while the fresh steam passes through cone 2.

When the locomotive is working with the large regulator valve open, i. e. when the cylinders are loaded to 0.3 of their volume and the speed developed is above 20 kilometres per hour, the exhaust steam pressure is between 0.2–0.25 atmosphere, the auxiliary valve 11 is opened and valves 14 and 16 are closed; then the injector works on exhaust steam alone, the exhaust steam passing through cones 3, 4, etc.

When the cylinders are not so fully loaded, i. e. when the pressure of the exhaust-steam is 0.1 atmosphere, valves 14 and 16 are opened, valve 11 is closed, and the injector works on a mixture of fresh and exhaust steam.

What I claim is:

1. A feed water injector, comprising a body casing, two separate, axially aligned, exhaust steam chambers in said body, axially aligned sets of exhaust steam nozzles, one set in each said exhaust steam chamber, a water inlet to the first said steam chamber, means for separately supplying exhaust steam to each said exhaust steam chamber, a live steam chamber in said body, a live steam nozzle in said live steam chamber, and axially aligned with said exhaust steam nozzles, the said nozzles sequentially opening one into the other, and one said exhaust steam chamber being closed from the other, except through said nozzles, means operable at will for discontinuing the flow of exhaust steam to the second of said exhaust steam chambers, upon drop in the exhaust steam pressure, the said means being entirely independent of and unaffected by the flow of exhaust steam to the first said exhaust steam chamber, and means having no controlling action on the flow of exhaust steam, operable at will for cutting in or out the live steam through the live steam chamber to the live steam nozzle.

2. A feed water injector, comprising a body casing, two separate, axially aligned exhaust steam chambers in said body, axially aligned sets of exhaust steam nozzles, one set in each said exhaust steam chamber, independent conduits leading from an external source of exhaust steam to each said exhaust steam chamber for separately supplying exhaust steam to each said exhaust steam chamber, a water inlet to the first said steam chamber, the said nozzles sequentially opening one into the other, and the first exhaust steam chamber being closed from the second except through said nozzles, and means in the conduit to said second exhaust steam chamber operable at will for discontinuing the flow of exhaust steam thereto.

3. A feed water injector, comprising a body casing, two separate, axially aligned exhaust steam chambers in said body, axially aligned sets of exhaust steam nozzles, one set in each said exhaust steam chamber, a water inlet to the first said steam chamber, independent conduits leading from an external source of exhaust steam to each said exhaust steam chamber for separately supplying exhaust steam to each said exhaust steam chamber, a live steam chamber in said body, a live steam nozzle in said live steam chamber, and axially aligned with said exhaust steam nozzles, the said nozzles sequentially opening one into the other, and the first exhaust steam chamber being closed from the second except through said nozzles, means in the conduit to said second exhaust steam chamber operable at will for discontinuing the flow of exhaust steam, upon drop in the exhaust steam pressure, the said means being entirely independent of and unaffected by the flow of exhaust steam to the first exhaust steam chamber, and means having no controlling action on the flow of exhaust steam, operable at will for cutting in or out the live steam through the live steam chamber to the live steam nozzle.

4. In a feed water injector, a body casing, two separate and independent, axially aligned exhaust steam chambers in said body, a water inlet to said first exhaust steam chamber, axially aligned sets of exhaust steam nozzles, one set in each said exhaust steam chamber, means for separately supplying exhaust steam to each said exhaust steam chamber, the first exhaust steam chamber communicating with the entrance to at least one nozzle of the set of nozzles disposed therein at a point after the introduction of the feed water into the conduit formed by the said nozzles, the feed water thus being heated step by step by the admixture therewith of independent supplies of exhaust steam, with full heat content, in the said separate exhaust steam chambers, a live steam nozzle in said live steam chamber, and axially aligned with said exhaust steam nozzles, the said nozzles sequentially opening one into the other, and one said exhaust steam chamber being closed from the other except through said nozzles, means operable at will for discontinuing the flow of exhaust steam to the second of said exhaust steam chambers, upon drop in the exhaust steam pressure, the said means being entirely independent of and unaffected by the flow of exhaust steam to the first exhaust steam chamber, and means having no controlling action on the flow of exhaust steam, operable at will for cutting in or out the live steam through the live steam chamber to the live steam nozzle.

5. A feed water injector, comprising a body casing, two separate, axially aligned steam chambers in said body, axially aligned sets of exhaust steam nozzles, one set in each said exhaust steam chamber, a water inlet to the first said steam chamber, means for separately supplying exhaust steam to each said exhaust steam chamber, separate means for controlling the supply of exhaust steam through each said separate supply means, the means for controlling the supply of exhaust steam to the second exhaust steam chamber being entirely independent of and unaffected by the flow of exhaust steam to the first exhaust steam chamber, a live steam chamber in said body, a live steam nozzle in said live steam chamber, and axially aligned with said exhaust steam nozzles, the said nozzles sequentially opening one into the other, one said exhaust steam chamber being closed from the other except through said nozzles, means having no controlling action on the flow of exhaust steam operable at will for cutting in or out the live steam through the live steam chamber to the live steam nozzle, and valved means between said live steam chamber and said first exhaust steam chamber for leading live steam into the first exhaust steam chamber, and in so doing, for decreasing the pressure of the live steam thus introduced to approximately that of the exhaust steam, the supply of exhaust steam to the two exhaust steam chambers having first been discontinued.

6. A feed water injector, comprising a body casing, and in said body, an exhaust steam chamber having an exhaust steam nozzle therein, and a live steam chamber having a live steam nozzle therein, said nozzles being axially aligned and the live steam nozzle opening into said exhaust steam nozzle, a source of exhaust steam for said exhaust steam nozzle, a conduit between said live steam chamber and said exhaust steam chamber, valve means for controlling the supply of live steam to said conduit, opposed valves in said exhaust steam chamber, one adapted to control the outlet of said live steam conduit to the exhaust steam chamber, and the other controlling the incoming exhaust steam, stems for said valves, and a cam element on which said valve stems ride, the relation of the cam element to said valve stems being such that actuation of one valve in one direction is accompanied by simultaneous actuation of the other valve in the converse direction.

7. A feed water injector, comprising a body casing, two separate, axially aligned steam chambers in said body, axially aligned sets of exhaust steam nozzles, one set in each said exhaust steam chamber, a water inlet to the first said steam chamber, means for separately supplying exhaust steam to each said exhaust steam chamber, means entirely independent of and unaffected by the flow of exhaust steam to the first exhaust steam chamber, for controlling the supply of exhaust steam through the supply means to the second exhaust steam chamber, a live steam chamber in said body, a live steam nozzle in said live steam chamber, and axially aligned with said exhaust steam nozzles, the said nozzles sequentially opening one into the other, one said exhaust steam chamber being closed from the other except through said nozzles, valve means operable at will for cutting in or out the live steam through the live steam chamber to the live steam nozzle, a conduit between said live steam chamber and said first exhaust steam chamber, valve means controlling the supply of live steam to said conduit, opposed valves in said first exhaust steam chamber, one adapted to control the outlet of said live steam conduit into the first exhaust steam chamber, and the other controlling the incoming exhaust steam thereto, and a common actuating means for said opposed valves, to which the valves are so related that actuation of one valve in one direction is accompanied by the simultaneous actuation of the other valve in the converse direction.

8. In a feed water injector, a body, and in said body, a live steam chamber having a live steam nozzle therein and an exhaust steam chamber having an exhaust steam nozzle therein, the said nozzles being axially aligned and the live steam nozzle opening into the exhaust steam nozzle, a pressure-reducing conduit for conducting live steam from said live steam chamber to said exhaust steam chamber, a multi-part valve for controlling the flow of live steam from said live steam chamber, the first part of the valve being movable within and adapted to seat against a second part thereof, and said second part being adapted normally to seal the inlet to said conduit from said live steam chamber and to seat against the inlet to said live steam nozzle, the first actuation of said multi-part valve causing the first part thereof to move from its seat against said second part and to open a passage for live steam from said live steam chamber to said live steam nozzle, and further movement of said multi-part valve causing the second part thereof to lift from its seat and uncover said conduit, to permit the live steam to flow through said reducing conduit to the exhaust steam chamber.

IVAN TROFIMOV.